United States Patent [19]

De Busscher et al.

[11] 4,292,981
[45] Oct. 6, 1981

[54] COMBINE HARVESTER CONVEYOR

[75] Inventors: Cyriel R. J. De Busscher, Sijsele-Damme; Francois Van Herpe, Houtem (Vlierzele), both of Belgium

[73] Assignee: Sperry Corporation, New Holland, Pa.

[21] Appl. No.: 165,152

[22] Filed: Jul. 1, 1980

[30] Foreign Application Priority Data

Jul. 6, 1979 [GB] United Kingdom ............... 23774/79

[51] Int. Cl.³ ...................... A01D 45/02; A01F 12/18
[52] U.S. Cl. ................................. 130/27 F; 130/27 T; 56/14.6
[58] Field of Search ............ 130/27 T, 27 H, 27 HA, 130/27 F; 56/14.6

[56] References Cited

U.S. PATENT DOCUMENTS 3,994,304 11/1976 Todd et al. ........................ 130/27 T
4,208,858 6/1980 Rowland-Hill ................... 130/27 T

FOREIGN PATENT DOCUMENTS 931850 8/1973 Canada ............................. 130/27 T
961727 1/1975 Canada ............................. 130/27 T
643116 1/1979 China ............................... 130/27 T Primary Examiner—Robert A. Hafer
Attorney, Agent, or Firm—James R. Bell; Frank A. Seemar; Larry W. Miller

[57] ABSTRACT

A combine harvester includes a conveyor attached tangentially to a rethresher rotor. An auger extends from the rethresher to a grain pan. A rotatable shaft carries the auger and also carries an impeller. The auger has a first diameter adjacent the rethresher rotor and has a second, larger diameter adjacent the grain pan.

6 Claims, 3 Drawing Figures

COMBINE HARVESTER CONVEYOR

BACKGROUND OF THE INVENTION

This invention relates generally to threshing and more particularly to threshing machines having crop material conveyors.

While the terms "grain", "straw", and "tailings" are used principally throughout this specification for convenience, it should be understood that these terms are not intended to be limiting. Thus "grain" refers to that part of the crop material which is threshed and separated from the discardable part of the crop material which is referred to as "straw". Incompletely threshed ears are referred to as "tailings". Also, the terms "forward", "rearward", "left", "right" etc. when cited in connection with the combine harvester and/or components thereof are determined with reference to the forward operative travel of the combine harvester in the field and should not be understood to be limiting.

In known combine harvesters, grain is threshed and separated in a threshing and separating mechanism and the separated grain, together with impurities of all sorts, such as chaff, dust, straw particles, tailings, is fed to a clearing mechanism for cleaning. Clean grain is collected and fed to a graintank for temporary storage. The tailings are separated from the clean grain and impurities for reprocessing. This reprocessing either means recycling the tailings through the threshing and separating mechanism or treating them in a separate tailings rethreshing means. In both cases the tailings are conveyed through an elevator which usually is of the paddle type.

The present invention is concerned with this tailings return elevator and while the invention conceivably can be applied either on so-called conventional combine harvesters with separating means comprising straw walkers, or on so-called rotary combine harvesters with axial flow type threshing and separating rotors, the invention is particularly useful on rotary combines of the type comprising one or more transversely extending threshing and/or separating rotors of which at least one end extends beyond the side edge of the cleaning mechanism disposed therebelow.

In conventional combine harvesters, wherein the tailings are recycled through the threshing and separating mechanisms a tailings elevator, which usually is of the paddle type, extends at one side of the machine between a location beneath the cleaning mechanism where tailings are collected and a location forwardly and generally above the level of the threshing means at one side thereof and at which location the elevator supplies tailings to a transverse tailings distributing auger. This arrangement of the tailings elevator and distributing auger is quite long and hence expensive and moreover it takes up much room whereby it is quite cumbersome and also whereby access to other components of the machine and drive means therefore is hampered considerably.

Furthermore, in rotary combine harvesters of the type comprising one or more transversely extending threshing and/or separating rotor assemblies of which at least one end extends beyond the side edges of the cleaning mechanism which is disposed therebelow, additional conveyor means are required for conveying crop material which is separated at said end toward the cleaning device. This again takes up quite some room and increases the cost. Also the material separated in these separator portions is not at all evenly spread over the full width of the cleaning mechanism, whereby uneven loading or overloading of the latter may occur.

Also, during recent years, the size and more especially the capacity of combines have increased considerably which means that the threshing, separating and cleaning means have to be capable of handling considerably increased volumes of crop material. With the present large capacity machines, even small percentages of tailings represent a considerable volume. Hence the tailings return elevator and tailings distributor auger must be quite sizeable and also recycling of these volumes of tailings through the threshing, separating and cleaning means often leads to an uneven loading and/or an overloading of the various components both of which are disadvantages as both ultimately result in considerable losses.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a combine harvester conveyor including a rethresher portion having a rethresher rotor and and an auger portion extending tangentially from the rethresher portion to a grain pan. A rotatable shaft carries an auger and an impeller. The auger has a first diameter adjacent the rethresher rotor and has a second, larger diameter adjacent the grain pan.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
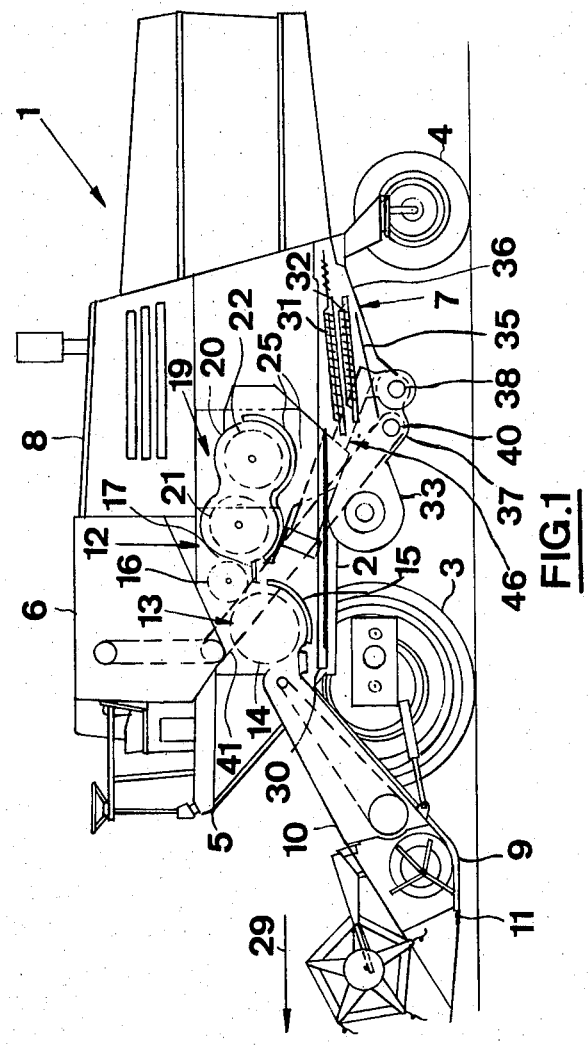
FIG. 1 is a side elevation illustrating an embodiment of a combine harvester of this invention.

With reference to FIG. 1, the combine harvester embodying the present invention is generally indicated at 1 and comprises a main frame or chassis 2 supported on a pair of drive wheels 3 and a pair of steerable wheels 4 (only one wheel of each pair being shown). Supported on the main frame 2 are an operator's platform 5, a grain tank 6, a grain cleaning mechanism 7 and an engine 8. A conventional header 9 and a feed conveyor 10 extend forwardly of the machine. The main frame also supports a threshing and separating mechanism which is generally indicated at 12. A threshing portion 13 thereof comprises a conventional rotatable threshing cylinder 14 cooperable with a conventional stationary threshing concave 15, the operation of which is generally known in the art. Rearwardly of the threshing cylinder 14 and the associated concave 15 is provided a conventional deflector or so-called straw beater 16 with a cooperating beater grate 17. These components have substantially the same width as the threshing cylinder 14 and concave 15 and are arranged to deflect the straw mat issuing from the threshing mechanism.

Rearwardly of the straw beater 16 is provided a separating mechanism 19 which basically is composed of a single transversely extending casing or housing 20 with a pair of separator rotors 21,22 therein. The width of the separating mechanism 19 substantially exceeds the width of the threshing mechanism 13 whereby the outer ends of the separating mechanism 19 extend past the respective ends of the threshing mechanism 13. Preferably, the separating mechanism 19 has a width of about three meters.

The transversely extending separating rotors 21,22 are arranged in tandem inside the casing 20, part of which is defined by separator concaves 25. The rotors 21,22 are driven in the same direction 29 and comprise crop-treating and crop conveying elements cooperable with the separating concaves 25 and operable in use to separate grain from the straw while conveying approximately half the straw mat in a first spiral path around both rotors 21,22 at the inner side of said casing 20 to one end of the separator mechanism 19 for discharge, and the remainder of the straw mat in an opposite spiral path and again around both rotors 21,22 to the opposite end for discharge.

The cleaning mechanism 7 is disposed underneath the threshing and separating mechanism 12 with its longitudinal plane of symmetry coinciding with the plane of symmetry of said threshing and separating mechanism. The cleaning mechanism 7 has a width which substantially corresponds to the width of the threshing cylinder 14 and associated concave 15 and thus the separating mechanism 19 has opposite ends which extend substantially beyond the side edge of the cleaning device disposed therebelow. The cleaning device 7 is basically composed of a grain pan 30 for collecting grain separated in the threshing and separating mechanism 12, cleaning sieves 31,32 located rearwardly thereof, and a cleaning fan 33 disposed forwardly of the sieves 31,32 and below the grain pan 30. The cleaning sieves 31,32 and the grain pan 30 are mounted for oscillatory movement on the combine harvester chassis. A clean grain collecting chute 35 and a tailings collecting chute 36, which are generally known in the art, are disposed below the cleaning sieves 31 and 32 and are arranged to discharge clean grain and tailings received from the cleaning sieves 31,32 into a clean grain auger through 37 and a tailing auger trough 38, respectively. The clean grain auger trough 37 extends transversely of the combine harvester and contains a clean grain auger 40 having a discharge end adjacent one side of the cleaning mechanism 7 to which collected grain is conveyed. A clean grain elevator 41 extends from said discharge end, alongside the threshing mechanism 13 and forwardly of the separating mechanism 19 to the grain tank 6.

A cylindrical rethresher 45 includes a rethresher rotor 62 including a number of radially extending vanes 65. An elevator conveyor 46 such as an auger tube 68 extends tangentially from rethresher 45, see FIG. 2.

A tailings return conveyor 67 extends between the outlet 64 of each tailings rethresher 45 and an aperture in the combine side wall above the level of the grain pan 30. Each such return conveyor 67 is inclined upwardly in a forward direction and passes below an outer end of the separating mechanism 19. Preferably each return conveyor 67 comprises an auger tube 68 to which is coupled a collecting chute 69 intermediate its ends. The diameter of the auger tube 68 downstream of the collecting chute 69, this means forwardly of said chute, as seen in the direction of operative travel, exceeds the diameter of the auger tube portion which is coupled to the rethresher 45. An auger 70 comprising two portions of different diameter is installed in the auger tube 68, with the portion having the larger diameter being positioned in the downstream auger tube section.

The collecting chute 69 has an upwardly facing opening adapted to receive material separated in the portion of the separating mechanism 19 extending beyond the adjacent side edge of the cleaning mechanism 7 therebelow and is tapering downwardly and coupled to the auger tube 68 in a manner to lead all material received therein from the separating mechanism 19 toward said auger tube.

Figure 2:
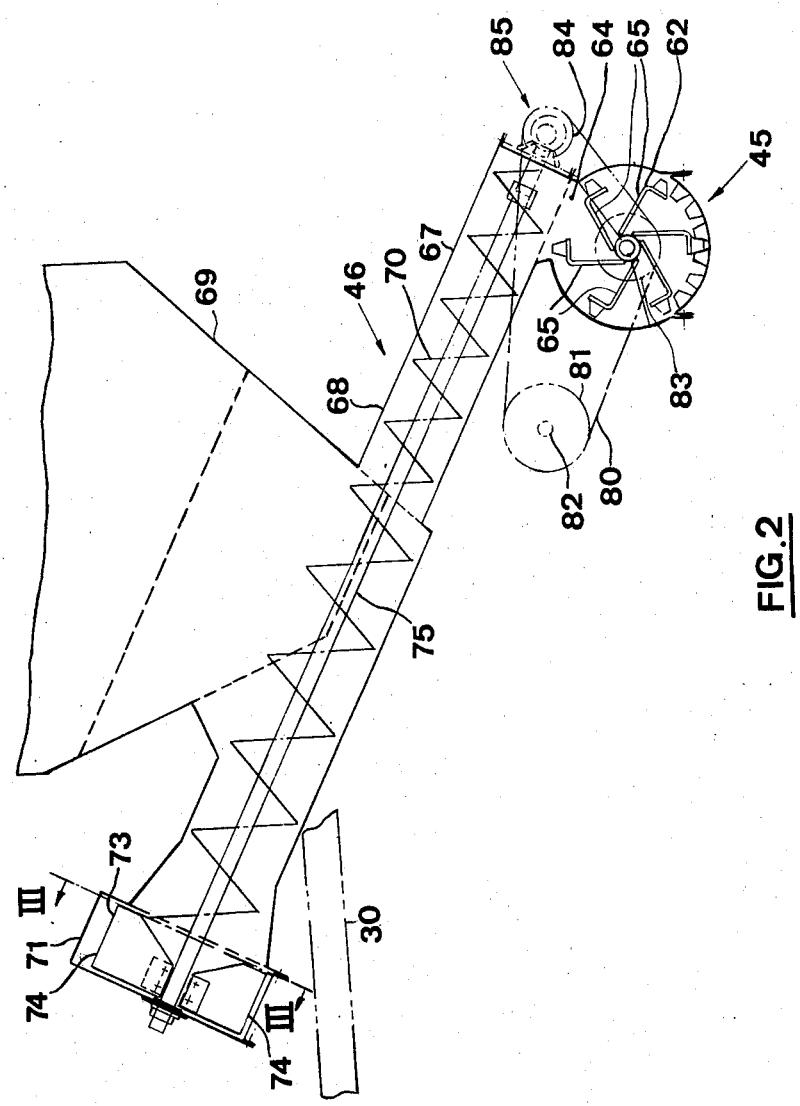
FIG. 2 is a cross-sectional view diagrammatically illustrating an embodiment of the conveyor of this invention.
Figure 3:
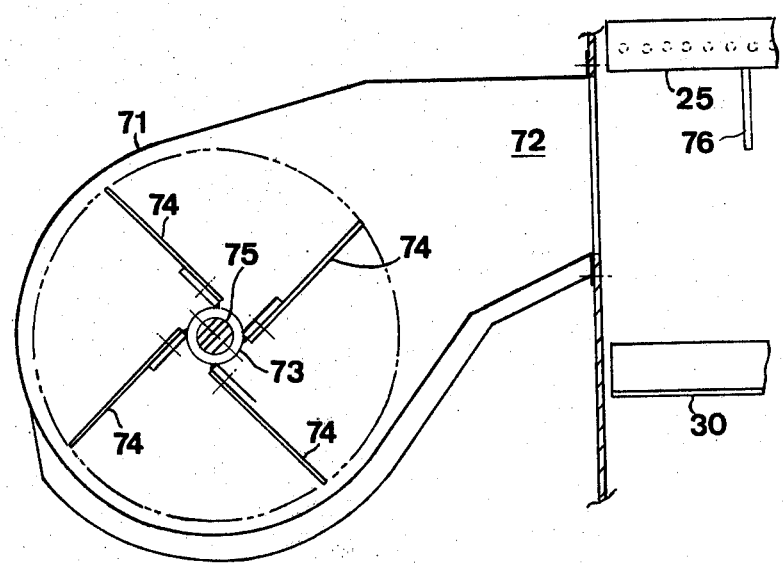
FIG. 3 is a cross-sectional view diagrammatically illustrating a portion of the conveyor viewed from line III—III of FIG. 2.

At its discharge end, FIGS. 2 and 3, each auger tube 68 tapers outwardly and is coupled to an impeller housing 71 which extends coaxially with said auger tube and which has a discharge opening 72, FIG. 3, coinciding with said opening in the combine sidewall above the grain pan. An impeller rotor 73 in the form of impeller blades 74 mounted on an extension of an auger shaft 75 is provided in said housing 71 and is operable to throw material across the grain pan 30. Deflector plates 76 may be installed underneath the separator concaves 25 and in the path of material issuing from the impellers at both sides of the combine main body.

As the combine harvester 1 is propelled forwardly over a field, the crop material to be harvested is severed from the stubble by a sickle bar 11 on the header 9 and is conveyed by the header 9 and the feed conveyor 10 to the threshing and separating mechanism 12. The crop material is conveyed over the threshing concave 15 and grate 17 by the threshing cylinder 14 and the straw beater 16, respectively while being threshed. The crop material (which may be wheat, corn, rice, soybeans, rye, rapeseed, barley, etc.) is thus rubbed and beaten whereby the grain, seed, etc. is loosened and separated from the straw stalks, coils or other discardable part of the crop material. In the separating mechanism 19, approximately half the straw mat is conveyed in a first spiral path around the rotors 21,22 at the inner side of the casing 20 to one end of the separator mechanism 19 for discharge onto the ground while that the remainder of the straw mat is conveyed in an opposite spiral path and again around said rotors 21,22 and at the inner side of the casing 20 to the opposite end of the separator mechanism 19 for discharge. During this spiral movement of the crop material, grain not yet separated in the threshing mechanism 13 and through the straw beater grate 17, is separated through the separator concaves 25. Together with grain, all sorts of impurities such as chaff, dust, short straw particles and tailings are equally separated from the straw mat in the threshing and separating means 12. Material, separated in the threshing mechanism 13, the straw beater 16 and associated grate 17, and the central portion of the separating mechanism 19, which are all disposed immediately above the cleaning mechanism 7, is dropped directly onto said cleaning mechanism 7. Material separated in the outer ends of the separating mechanism 19, which extend sidewardly beyond the side edges of the cleaning mechanism, is received in the collecting chutes 69 for directing it toward the associated auger tubes 68.

Most, if not all of the material directed to the cleaning mechanism 7 is received on the grain pan 30 thereof which conveys it stepwise in a rearward direction to the cleaning sieves 31,32. These cleaning sieves 31,32 and the cleaning fan 33 are arranged to discharge light impurities such as chaff and dust in a rearward direction onto the ground, while collecting clean grain on the clean grain collecting chute 35 for conveying it to the clean grain auger 40. Clean grain is further transported by the clean grain elevator 41 to the grain tank 6 on top of the machine for temporary storage therein.

The impetus imparted to the material by the rethresher rotor 62, FIG. 2, causes said material to leave the rethresher 45 and to enter the tailings return conveyor 67 in an upward direction through an opening 64 after it has passed over the full length of the aggressive rethresher means. Material entering the conveyor 67, and which thus is a mixture of grain, chaff and dust, is caught by the flights of the auger 70 and conveyed toward the upper end thereof. Material separated in the outer end of the separating mechanism 19 above the conveyor 67 and collected in the collecting chute 69 is added to the rethreshed tailings in the conveyor 67 and is transported together therewith to the impeller rotor 73 which throws this mixture across the grain pan 30. The deflectors 76 in the streams of crop material entering the area above the grain pan 30 from the opposite sides, help in more or less evenly spreading said material across said grain pan 30. This material, which comes either from the rethreshers 45 or from the outer ends of the separating mechanism 19, is processed in the cleaning mechanism 7 together with the material received on the grain pan directly from the threshing and separating mechanism 12. The drive of the various components of the invention is very simple and is composed of a chain 80 extending around a first sprocket 81 on an intermediate driven shaft 82 on the combine harvester, a second sprocket 83 for driving rethresher rotor 62, and finally a third sprocket 84 on the input shaft of an angled gearbox 85. The angled gearbox 85 is attached to the lower end of the tailings return conveyor 67 and the output shaft thereof is drivingly coupled to the return auger 70.

With the parts assembled as set forth above all components such as the threshing and separating mechanisms, for example, can be used to their maximum capacity for which they have been designed and without any undue risks of unevenly loading and/or overloading the same as a result of being supplied with tailings and separating efficiency of such machines is considerably improved. Also, the risk for unevenly loading the cleaning mechanism with tailings is reduced substantially as tailings are returned to the grain pan in substantially equal amounts from the opposite sides thereof and as the tailings are spread across the width of said grain pan; the deflectors 76 helping to reach an even loading. Furthermore, material separated in the outer portions of the separating means 19 is substantially evenly spread across the grain pan.

Finally, as rethreshed tailings leave the stationary rethresher means, they are immediately discharged in a tangential direction towards the return conveyor. This avoids any tailings being recycled in the tailings rethresher. This discharge of tailings from the rethresher to the conveyor is very smooth without any abrupt changes in the direction of movement, whereby again all hesitations in the movement of the material are avoided. This is especially so as the return auger which receives the tailings from the rethresher rotor is positioned closely adjacent said rethresher rotor at the transfer area. Thus the tailings are passed continuously, fluently and quickly through the various components without any substantial risk of jamming and, as all components can be driven at fairly high speeds, large volumes of tailings can be processed with components of comparatively small dimensions.

The tailings return conveyors are very short in comparison to known tailings return conveyors and said conveyors with the impellers at the discharge ends thereof are very simple in design. Also the drive means therefore are very simple and accordingly, the tailings return means are comparably cheap. Yet these tailings return means serve a dual purpose, namely on the one hand the recycling of rethreshed tailings and on the other hand the transport of material separated in portions of the separating mechanism to the cleaning mechanism and the distribution thereof across the width of said cleaning mechanism. Hence no separate conveyors are required to accomplish this transport and distribution and thus the arrangement according to the invention is not at all cumbersome. Instead, good access to all other combine components is provided.

Finally the tailings return conveyors according to the present invention are capable of handling all sorts of crops without any serious risks for plugging, even those which in many prior art designs invariably lead to problems such as e.g. weed infested wet crops.

The foregoing has described combine harvester coveyors. It is anticipated that aspects of the present invention, other than those specifically defined in the appended claims, can be obtained from the foregoing description and the drawings.

Having thus described the invention, what is claimed is:

1. A combine harvester conveyor comprising:
    a cylindrical rethresher portion having a rethresher rotor;
    an auger portion including an auger tube extending from a first end adjacent said rethresher portion to a second end adjacent a grain pan;
    means for guiding crop material to said auger portion, said means including a chute connected to said auger tube between said first and second ends; and
    a shaft rotatably mounted in said harvester, said shaft extending between said first and second ends, said shaft rotatably mounted in said auger portion and carrying an auger member and an impeller, and said auger member having a first diameter portion and a second diameter portion greater than said first diameter portion, said first diameter portion extending from said first end to said chute and said second diameter portion extending from said chute to said second end.

2. The harvester of claim 1 including:
    means connected to said first rethresher rotor and said shaft for driving same.

3. The harvester of claim 1 including:
    a collecting chute connected to said auger portion between said first and second ends.

4. The harvester of claim 1 wherein said impeller is of a construction sufficient for urging crop material from said auger portion to said grain pan.

5. The harvester of claim 4 including:
    means connected adjacent said grain pan for deflecting said crop material urged by said impeller and for substantially evenly spreading said material across said grain pan.

6. The harvester of claim 3 wherein the auger has said first diameter between said first end and said collecting chute and has said second diameter between said collecting chute and said second end.

* * * * *